Figure 2:
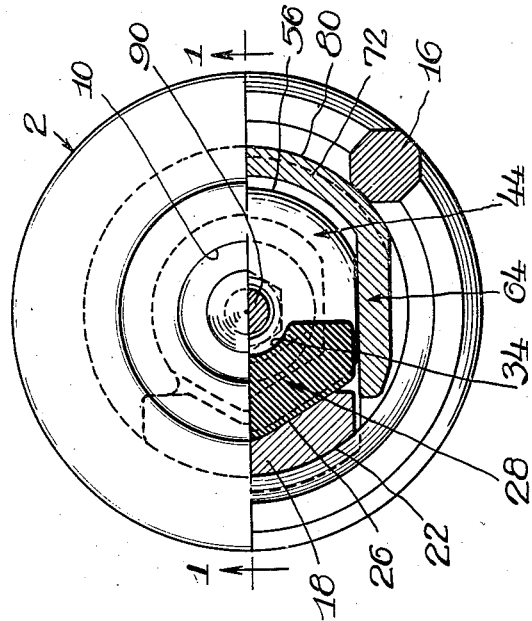

March 12, 1946. D. M. YOUNG 2,396,547
SNUBBER
Filed Oct. 19, 1942 3 Sheets-Sheet 1

INVENTOR.
Donald M. Young
BY
Atty.

March 12, 1946. D. M. YOUNG 2,396,547
SNUBBER
Filed Oct. 19, 1942  3 Sheets-Sheet 2
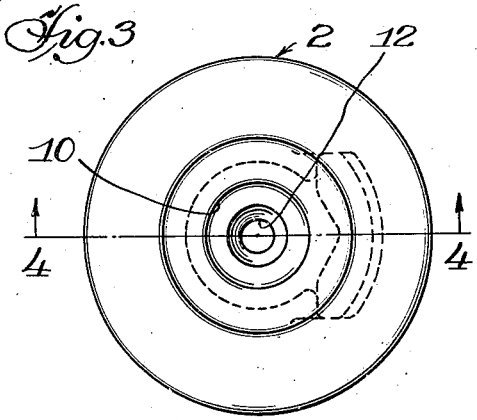
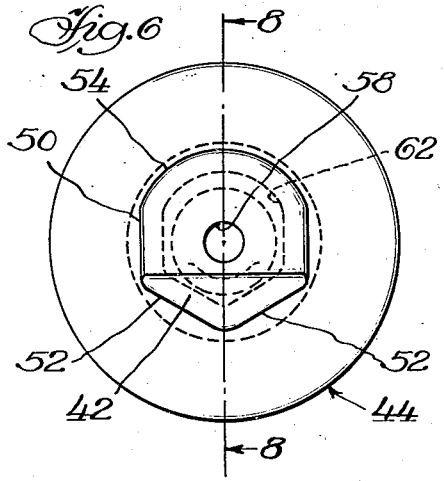
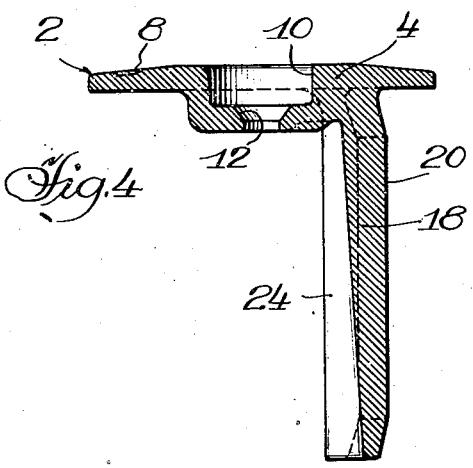
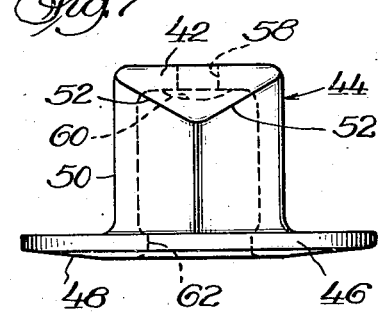
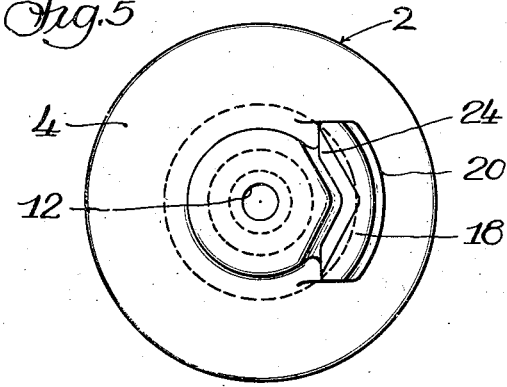
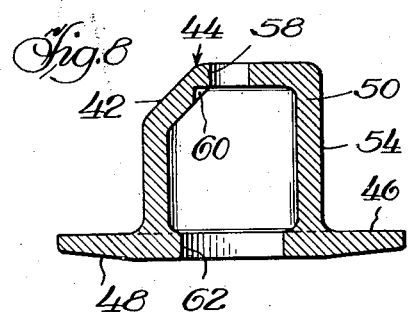
INVENTOR.
Donald M. Young

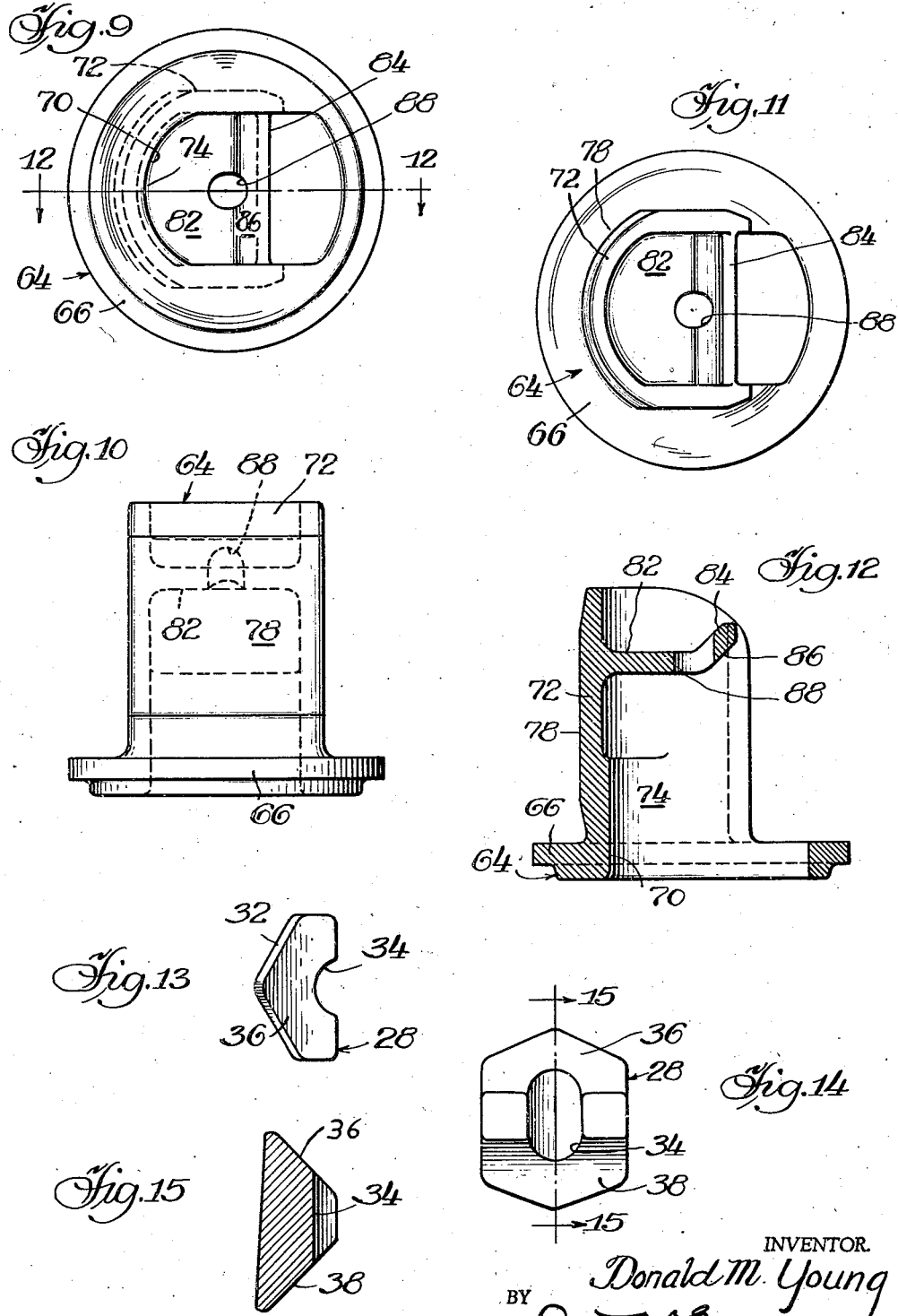

Patented Mar. 12, 1946

2,396,547

UNITED STATES PATENT OFFICE 2,396,547

SNUBBER

Donald M. Young, Chicago, Ill., assignor to American Steel Foundries, Chicago, Ill., a corporation of New Jersey Application October 19, 1942, Serial No. 462,459

25 Claims. (Cl. 267—9)

My invention relates to friction absorbing devices and more particularly to such a device commonly called a snubber which, when utilized in conjunction with a bolster supporting coil spring group, serves to reduce or substantially eliminate harmonious oscillations of the springs constituting said group.

The general object of my invention is to design a snubber which may be substituted for one of the springs of the above-mentioned group.

A more specific object of my invention is to design a snubber in which a friction follower comprises a friction wall sleeved within and in frictional engagement with a coil spring, said wall being frictionally engaged on the inner surface thereof by a single friction wedge urged into engagement therewith and with a spaced follower by means of a novel spring seat casting associated with said coil spring.

My invention comprehends a top follower of novel form comprising a disc-like base affording a seat for one end of the snubber and a friction wall integrally formed with and angularly disposed with respect to said base, said friction wall comprising on one side thereof an arcuate friction surface formed and arranged for engagement with an associated coil spring, and on the opposite face thereof a diagonal V-shaped friction surface formed and arranged for engagement with an associated friction wedge.

My invention also comprehends a bottom follower of novel form and comprising a substantially annular disc-like base affording a seat for the snubber and a central hollow boss formed on said base, said boss comprising a diagonally arranged friction surface on one side thereof formed and arranged for engagement with an associated friction wedge, and a substantially vertical arcuate friction surface on the opposite side thereof formed and arranged for frictional engagement with an associated spring seat member.

Another object of my invention is to design a friction wedge of novel form, said wedge being a solid metallic body comprising friction surfaces on three sides thereof and angularly disposed with respect to each other, said member being provided with a slot interrupting two of said friction surfaces and formed and arranged for the reception of the adjacent side of an associated retaining bolt.

Still another object of my invention is to design a spring seat casting of novel form, said casting comprising a substantially round base affording a seat for an associated coil spring, an opening through said base, and a substantially U-shaped wall formed on said base about the margin of said opening, said wall being formed on the outer surface thereof with an arcuate friction face formed and arranged for engagement with said spring, and said wall being formed on the inner face thereof with an arcuate friction surface formed and arranged for engagement with an associated follower. A transverse web is integrally formed with said U-shaped wall and provides a diagonally arranged friction face for complementary engagement with an associated wedge member, said web comprising an opening therethrough formed and arranged for the reception of the associated securing bolt.

Figure 1:
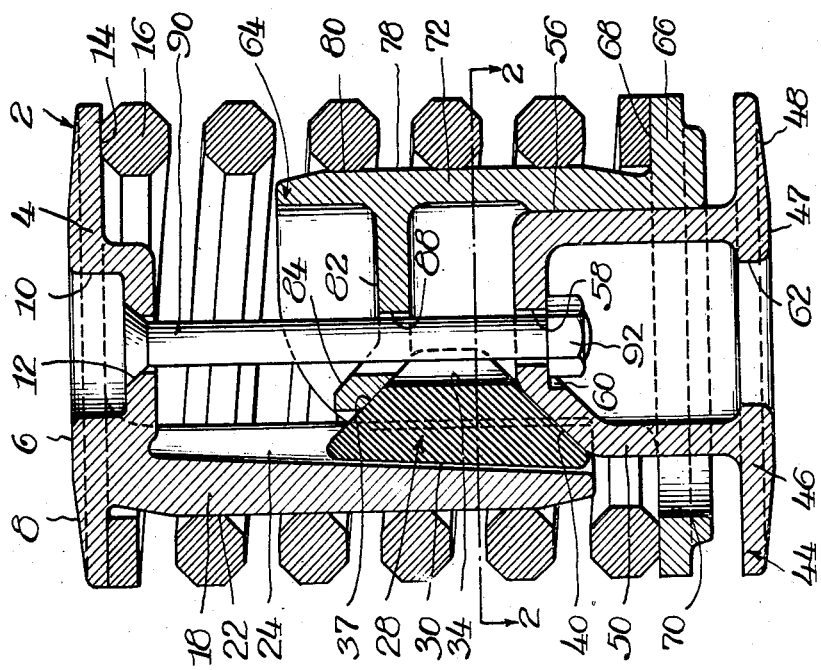

In the drawings, Figure 1 is a sectional view of my novel snubber, taken substantially in the vertical plane indicated by the line 1—1 of Figure 2, and Figure 2 is a top view of the structure shown in Figure 1, the top half thereof being a plan view, and the bottom half thereof being a sectional view, taken substantially in the horizontal plane indicated by the line 2—2 of Figure 1.

Figures 3 to 5 inclusive show in detail my novel form of top follower, Figure 3 being a top plan view thereof, Figure 4 being a sectional view taken in the plane indicated by the line 4—4 of Figure 3, and Figure 5 being a bottom plan view thereof.

Figures 6 to 8 inclusive show in detail my novel form of bottom follower, Figure 6 being a top plan view thereof, Figure 7 being a side elevation taken from the bottom as seen in Figure 6, and Figure 8 being a sectional view taken substantially in the plane indicated by the line 8—8 of Figure 6.

Figures 9 to 12 inclusive show in detail my novel form of spring seat casting, Figure 9 being a bottom plan view thereof, Figure 10 being a view in elevation taken from the left as seen in Figures 11 and 12, Figure 11 being a top plan view, and Figure 12 being a sectional view taken in the plane indicated by the line 12—12 of Figure 9.

Figures 13 to 15 inclusive show my novel form of friction wedge, Figure 13 being a top plan view thereof, Figure 14 a side elevation taken from the right as seen in Figure 13, and Figure 15 being a sectional view taken in the plane indicated by the line 15—15 of Figure 14.

Describing my invention in detail, the top follower generally designated 2 is preferably a cast steel member and comprises the disc-like base 4 affording a seat as at 6 (Figure 1) for an associated supported member, said base being tapered at 8 to afford a rocking movement for said member upon the seat 6. Centrally thereof the base 4 is provided with a cylindrical cavity 10 formed and arranged for the reception of positioning means on the associated supported member, as will be clearly apparent to those skilled in the art, and the base 4 is also provided with an opening 12 therethrough communicating with the cavity 10 and formed and arranged for the reception of the head on an associated retaining bolt, as hereinafter more fully described.

The base 4 affords on the bottom surface thereof a seat as at 14 (Figure 1) for the coil spring 16, and integrally formed with said base 4 and depending therefrom is a friction wall 18, said wall being sleeved within the spring 16 and comprising the arcuate outer surface 20 (Figures 4 and 5) formed and arranged for frictional engagement as at 22 (Figures 1 and 2) with the spring 16, said spring being formed of a hexagonal bar in the modification shown in order to afford an efficient frictional engagement with the wall 18 as above described and with the associated spring seat casting in a manner hereinafter more fully described. On the inner surface thereof the wall 18 is provided with a diagonal V-shaped friction surface 24 formed and arranged for frictional engagement at 26 (Figure 2) with the side wedge 28, the apex of said V-shaped surface being afforded clearance at 30 (Figure 1) from the wedge 28 in order to facilitate wearing in between the surface 24 and the complementary surface on the wedge 28, as will be clearly apparent to those skilled in the art.

The side wedge 28 is shown in detail in Figures 13 to 15 inclusive, said wedge comprising on one side thereof the diagonal V-shaped friction surface 32 formed and arranged for engagement at 26 with the complementary surface 24 on the friction wall 18, as heretofore described, and the wedge 28 comprises on the opposite side thereof the arcuate recess or slot 34 adapted for the reception of the associated securing bolt as best seen in Figure 1 and as hereinafter more fully described. On the top thereof the wedge 28 is provided with a diagonal surface 36 formed and arranged for complementary frictional engagement as at 37 (Figure 1) with the associated spring seat casting in a manner hereinafter more fully described, and on the bottom thereof the wedge member 28 is provided with a diagonal surface 38 formed and arranged for frictional engagement as at 40 with a complementary surface 42 on the bottom follower 44.

The bottom follower is shown in detail in Figures 6 to 8 inclusive and said follower comprises the disc-like base 46 of generally annular form and affording on the bottom surface thereof a seat as at 47 (Figure 1) for the snubber on an associated supporting member, as will be understood by those skilled in the art, the bottom surface of the base 46 being tapered at 48 to afford a rocking movement of the snubber upon the seat 47 in the usual manner. Centrally thereof the base 46 is provided with the hollow upstanding projection or boss designated 50 and on one side thereof the boss 50 is provided with the before-mentioned diagonal friction surface 42 formed and arranged for complementary engagement at 40 with the friction wedge 28. It may be noted that the surface 42 is tapered at 52, 52 (Figures 6 and 7) to form a substantially V-shaped surface complementary to the surface 38 on the bottom of the wedge 28. On the side thereof opposite the surface 42 the boss 50 is provided with an arcuate friction surface 54 (Figures 6 and 8) formed and arranged for frictional engagement at 56 (Figures 1 and 2) with a complementary surface on the associated spring seat casting as hereinafter more fully described. The top wall of the boss 50 is provided with an opening 58 for the reception of an associated retaining bolt and the bottom surface of said top wall is provided with an arcuate recess 60 affording clearance for a nut on said bolt, as hereinafter more fully described. Centrally thereof the base 46 of the bottom follower 44 is provided with the round opening 62 formed and arranged for the reception of positioning means on the associated supporting member, as will be clearly understood by those skilled in the art.

My novel spring seat casting 64 is shown in detail in Figures 9 to 12 inclusive and, said casting comprises the substantially round base 66 affording a seat as at 68 (Figure 1) for the lower end of the spring 16. The base 66 comprises the opening 70 therethrough, said opening being formed and arranged for the reception of the projection 50 on the bottom follower 44. Formed on the base 66 of the spring seat casting 64 around the margin of the opening 70 is the upstanding substantially U-shaped wall 72, said wall comprising the arcuate inner surface 74 formed and arranged for frictional engagement as at 56 (Figures 1 and 2) with the complementary surface on the projection or boss 50 formed on the bottom follower 44, and the wall 72 comprises on the outer side thereof the arcuate friction surface 76 formed and arranged for frictional engagement at 80 (Figures 1 and 2) with the spring 16. Integrally formed with the U-shaped wall 72 is the transverse substantially horizontal web 82 upwardly flanged as at 84 to afford a diagonal friction face 86 formed and arranged for complementary engagement as at 37 (Figure 1) with the complementary surface on the side wedge 28, as heretofore described.

The web 82 comprises an opening 88 therethrough formed and arranged for the reception of the retaining bolt 90 (Figures 1 and 2), said bolt comprising a head countersunk in the opening 12 conveniently formed for that purpose in the base 4 of the top follower 2, and said head may be secured within the opening 12 in any convenient manner such as by welding. If desired, the head of the bolt 90 may be left free to move vertically within the opening 12 whereby positioning means on the associated supporting member and projecting through the opening 62 in the base 46 of the bottom follower 44 may cause the bolt 90 to move upwardly by contact therewith on extreme compressive action of the snubber, such as may readily occur during bouncing movement of the associated supported member. The bolt 90 projects through the opening 88 in the web 82 of the spring seat, through the recess 34 in the side wedge 28, and through the opening 58 in the top wall of the boss 50 formed on the bottom follower 44, the lower end of the bolt 90 projecting into the cavity within said hollow boss, and a nut 92 (Figure 1) is threaded on the lower end of said bolt and secured thereto in any convenient manner as by peening the lower extremity of the bolt, said nut 92 being conveniently accommodated within the recess 60 formed within the cavity of the boss 50.

It will be understood that although I have herein described the follower 2 as a top follower and the follower 44 as a bottom follower, the snubber may be inverted with the follower 44 a top follower and the follower 2 a bottom follower.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a snubber, a follower comprising a base and a friction wall projecting angularly therefrom, a wedge in frictional engagement with an inner surface on said wall, said wedge comprising top and bottom diagonal friction faces, a spaced follower in frictional engagement with one of said faces, a spring seat member engaged with the other of said faces, a coil spring sleeved over said wall and said member in frictional engagement therewith, said spring being seated at opposite ends thereof against said member and against the first-mentioned follower, and a retaining bolt extending through aligned openings in said wedge and said member, said bolt being fixed to one of said followers and slidably interlocked with the other thereof.

2. In a snubber, a follower comprising a base and a friction wall projecting therefrom, a wedge in complementary diagonal V-shaped face engagement with an inner surface on said wall, said wedge comprising top and bottom diagonal friction faces, a spaced follower in frictional engagement with one of said faces, a spring seat member engaged with the other of said faces and in frictional engagement with the last-mentioned follower, a coil spring sleeved over said wall and said member in frictional engagement therewith, said spring being seated against the first-mentioned follower and said member, and a retaining bolt extending through openings in said wedge and said member, said bolt being fixed to one of said followers and slidably interlocked with the other follower.

3. In a snubber, a follower comprising a base and a friction wall projecting angularly therefrom, a wedge in frictional engagement with an inner surface on said wall, said wedge comprising top and bottom diagonal friction faces, a spaced follower in frictional engagement with one of said faces, a spring seat member engaged with the other of said faces, and a coil spring sleeved over said wall and said member in frictional engagement therewith, said spring being seated at opposite ends thereof against said member and against the first-mentioned follower.

4. In a snubber, a top follower comprising a depending friction wall, a wedge in frictional engagement with the inner surface of said wall, a bottom follower having a wedge surface in diagonal face engagement with the bottom of said wedge, a spring seat member having a wedge surface in diagonal face engagement with the top of said wedge, and a compression spring sleeved over said wall and said member in frictional engagement therewith, said spring being seated at opposite ends respectively against said top follower and said member, said wedge surfaces lying respectively in diagonal planes converging toward the longitudianl axis of said snubber whereby said wall is pinched between said wedge and said spring.

5. In a snubber, a follower comprising a friction wall disposed at one side of the longitudinal axis of said snubber, a member in frictional engagement with the inner surface of said wall, a plurality of friction means in diagonal face engagement respectively with the top and bottom of said member and in frictional engagement with each other, resilient means seated against one of said first-mentioned means and against said follower, and means engaged with said follower and the other of said means for retaining the device in assembled relationship, said resilient means being frictionally engaged with the outer surface of said wall.

6. In a snubber, a follower comprising a friction wall at one side of the longitudinal axis of said snubber, a member in diagonal V-shaped frictional engagement with the inner surface of said wall, a plurality of friction means in diagonal face engagement respectively with the top and bottom of said member and in frictional engagement with each other, resilient means seated against one of said first-mentioned means and against said follower, and means engaged with said follower and the other of said first-mentioned means for retaining the device in assembled relationship, said resilient means being frictionally engaged at all times with the outer surface of said wall.

7. As a new article of manufacture, a spring seat casting comprising a base affording a seat for an associated spring, an opening through said base, a substantially U-shaped wall around the margin of said opening and comprising a friction surface for engagement with said spring, and a transverse web integrally formed with said wall and comprising a flange angularly disposed with respect to said web and affording a diagonal friction face for engagement with an associated friction member.

8. As a new article of manufacture, a spring seat casting comprising a base affording a seat for an associated spring, an opening through said base, a substantially U-shaped wall around the margin of said opening and comprising a friction surface on the outer side thereof formed and arranged for frictional engagement with said spring, and a transverse web integrally formed with said wall and affording a diagonal friction surface for engagement with an associated friction member.

9. In a friction absorbing device, spaced followers affording seats for opposite ends of said device, wedge means in frictional diagonal face engagement with both of said followers, a member in diagonal face engagement with said means, resilient means under compression between said member and one of said followers and in frictional engagement with said member and a portion of the follower, and means for retaining the device in assembled relationship, said portion being pinched by and between said wedge means and said resilient means.

10. In a friction absorbing device, top and bottom followers affording seats for opposite ends of the device, wedge means having a diagonal face in engagement with said bottom follower and a vertical face in frictional engagement with said top follower, a spring seat member having a diagonal face in engagement with said wedge means and a vertical friction face in engagement with said bottom follower, and resilient means having opposite ends thereof bearing against said top follower and said spring seat member and in frictional engagement therewith, the diagonal and vertical faces of said member being disposed at opposite sides of the longitudinal axis of said device.

11. In a friction absorbing device, spaced followers affording seats for opposite ends of the device, a spring seat member in frictional engagement with one of said followers, a coil spring seated against said member and the other of said followers, and a wedge member in diagonal face engagement with both of said followers and with said first-mentioned member, a portion of said other follower being compressed by and between said wedge member and said spring.

12. In a snubber, a follower comprising a friction wall, a wedge engaged with the inner surface of said wall, means for maintaining said wedge in said engagement, said means including a spring support member in engagement with said wedge, and yielding means having opposite ends thereof bearing against said member and follower resisting relative frictional movement between said wedge and said wall, said yielding means being sleeved over and in frictional engagement with the outer surfaces of said wall and said member.

13. In a snubber, spaced followers, one of said followers comprising an annular integral base, a friction wall projecting therefrom at one side of the longitudinal axis of said snubber, a wedge surface on the other follower, a friction element engaging said surface and the inner surface of said wall, and means for urging said element into said engagement, said means comprising a spring seat member in frictional engagement with said other follower and in diagonal face engagement with said element, and a spring sleeved over said wall in engagement with the outer surface thereof and seated at opposite ends thereof against said base and said spring seat member, said wall being pinched by and between said spring and said element.

14. In a snubber, spaced followers, a spring seat member, a spring extending between said member and one of said followers, a friction wall on said follower at one side only of the longitudinal axis of said snubber, and a wedge engaging the inner surface of said wall and adjacent surfaces on said member and the other of said followers, said wall being compressed by and between said spring and said wedge.

15. In a snubber, spaced followers, a spring seat member, a spring extending between said member and one of said followers, a friction wall on said follower at one side only of the longitudinal axis of said snubber, a wedge engaging the inner surface of said wall and adjacent wedge surfaces on said member and the other of said followers, said wedge surfaces lying in planes converging toward said axis whereby said wall is compressed by and between said spring and said wedge.

16. In a snubber, spaced followers, a spring seat member, resilient means extending between said member and one of said followers, a friction element on said follower at one side only of the longitudinal axis of said snubber, and wedge means engaging the inner surface of said element and adjacent wedge surfaces on said member and the other of said followers, said wedge surfaces lying in respective planes converging toward said axis whereby said friction element is pinched by and between said resilient means and said wedge means.

17. In a snubber, a follower comprising a base and a friction element projecting angularly therefrom, friction means in frictional engagement with an inner surface on said element, said friction means comprising top and bottom diagonal wedge faces, a spaced follower in complementary engagement with one of said faces, a spring seat member engaged with the other of said faces, and a coil spring sleeved over said element in frictional engagement therewith, said spring being seated at opposite ends thereof against said member and against the first-mentioned follower.

18. In a snubber, a follower comprising a base and a friction wall projecting angularly therefrom, a wedge in frictional engagement with an inner surface on said wall, said wedge comprising spaced diagonal wedge faces, another follower in frictional engagement with one of said faces, a spring seat member engaged with the other of said faces, and resilient means sleeved over said wall and said member in frictional engagement therewith, said resilient means being seated at opposite ends thereof against said member and against the first-mentioned follower.

19. In a snubber, a follower comprising a friction wall disposed at one side of the longitudinal axis of said snubber, a member in frictional engagement with the inner surface of said wall, a pair of friction means in diagonal face engagement respectively with the top and bottom of said member and in frictional engagement with each other, and resilient means seated against one of said first-mentioned means and against said follower, said resilient means being frictionally engaged with the outer surface of said wall.

20. In a snubber, a follower comprising a friction wall disposed at one side of the longitudinal axis of said snubber, a member in diagonal V-shaped frictional engagement with the inner surface of said wall, a pair of friction means in diagonal face engagement respectively with the top and bottom of said member and in frictional engagement with each other, and resilient means seated against one of said first-mentioned means and against said follower, said resilient means being frictionally engaged with the outer surface of said wall.

21. In a friction absorbing device, spaced followers, each having a diagonal friction surface and a vertical friction surface, a spring seat member having a diagonal friction surface and a vertical friction surface, all of said diagonal surfaces being disposed on one side of the longitudinal axis of said device, the diagonal surfaces of one of said followers and said member converging toward said axis, a wedge in engagement with said diagonal surfaces, and resilient means sleeved over said member and one of said followers in frictional engagement with the vertical surfaces thereof and seated at opposite ends thereof against the follower and member, the vertical surface on the other follower being frictionally engaged with the vertical surface of said member.

22. In a friction absorbing device, spaced followers, each having a diagonal friction surface and a vertical friction surface, a member having a diagonal friction surface and a vertical friction surface, all of said diagonal surfaces being disposed on one side of the longitudinal axis of said device, the diagonal surfaces of one of said followers and said member converging toward said axis, a wedge in frictional engagement with said diagonal faces, and resilient means sleeved over said member and one of said followers in frictional engagement with the vertical surfaces thereof, the vertical surface on the other of said followers being frictionally engaged with the vertical surface of said member, and means engaged with said member and said followers for retaining the device in assembled relationship.

23. In a friction absorbing device, top and bottom followers each having a diagonal friction surface, a member in frictional engagement with said bottom follower, said member having a diagonal friction surface, a wedge in frictional engagement with the diagonal surfaces of said followers and said member, all of said diagonal surfaces being disposed at one side of the longitudinal axis of said device, the diagonal surfaces of said bottom follower and said member converging toward said axis, and resilient means sleeved over said member and said top follower in frictional engagement therewith.

24. In a snubber, spaced followers each having a diagonal friction surface and a vertical friction surface, a member in complementary engagement with the vertical surface of one of said followers, said member having a diagonal friction surface, a wedge confined between said diagonal surfaces in frictional engagement therewith, and resilient means sleeved over said member and the vertical surface of the other follower in frictional engagement therewith.

25. In a snubber, spaced followers, a member between said followers, said member and each of said followers having diagonally arranged friction surfaces, a wedge confined between and in frictional engagement with said surfaces, all of said surfaces lying at one side of the longitudinal axis of said device, the surfaces of said member and one of said followers converging toward said axis, and resilient means sleeved over said member and the other follower in frictional engagement therewith.

DONALD M. YOUNG.